March 26, 1968  J. JELLINEK ETAL  3,375,016

TWO-STAGE SEAL ARRANGEMENT

Filed March 9, 1964

JOHN JELLINEK
LOUIS B. WECKESSER, Jr.
INVENTORS

BY Claude Funkhouser
ATTORNEY

United States Patent Office 3,375,016
Patented Mar. 26, 1968

3,375,016
TWO-STAGE SEAL ARRANGEMENT
John Jellinek, Washington, D.C., and Louis B. Weckesser, Jr., College Park, Md., assignors to the United States of America as represented by the Secretary of the Navy
Filed Mar. 9, 1964, Ser. No. 350,624
4 Claims. (Cl. 277—58)

This invention relates generally to fluid sealing arrangements, and more particularly to an improved two-stage seal arrangement for sealing a space against the flow therethrough of heated gases and liquids.

The construction of certain high temperature devices, such as rocket and ramjet missile power plants, creates serious sealing problems which cannot be met by conventional seal constructions. One such sealing problem is present in a ramjet engine at the joint between the tubular structure within which fuel is burned and the tailpipe structure through which burned gases are exhausted. One of these structures is normally telescoped within the other to allow for relative movement therebetween caused by their widely varying operating temperatures, and the space between the structures must be sealed to prevent the escape of exhaust gases. The sealing arrangement utilized must provide effective sealing from the instant in time when exhaust gases begin to flow, must seal effectively in the presence of changing dimensions due to increasing temperatures, and must be capable of withstanding the destructive effect of the very high temperature exhaust gases. The present invention satisfies each of these requirements through the use of a two-stage seal, the first stage sealing during initial, relatively low temperature, conditions and the second stage sealing against subsequent, relatively high temperature conditions.

An object of this invention is to provide a seal arrangement which is responsive to changes in temperature of a flowing liquid and which remains effective as the temperature thereof increases.

Still another object of this invention is to provide a seal arrangement for preventing the passage of a heated fluid between the two telescoped members.

A further object of the present invention is to provide a seal for sealing the space between two concentrically disposed members against the flow therethrough of very high temperature gases.

Other objects and many of the attendant advantages of this invention will be readily appreciated as the same becomes better understood by reference to the following detailed description when considered in connection with the accompanying drawings, wherein.

In accordance with the present invention, a two-stage sealing arrangement prevents the flow of a heated liquid through a passageway. In a typical application of the invention in which it is desired to seal the annular space between two concentric cylindrical members, one of the members is provided with a pair of spaced, annular grooves. A conventional elastomeric O-ring is disposed within the groove closest to the source of hot gases so that said gases will first come into contact with it. A metallic O-ring is disposed in the other groove, and is constructed of a material having a coefficient of expansion greater than the material of which either of the telescoped members is manufactured.

As hot fluids flow through the inner member, they increase the temperature thereof, and cause the metallic O-ring to gradually expand until it is in tight sealing engagement with both members. The elastomeric O-ring seals the joint between the members during this expansion process, but thereafter may erode away under the effects of the hot fluids. If the elastomeric ring is destroyed, the expanded metallic ring constitutes the sole seal between the members and remains in tight sealing engagement to the impingement of the hot fluid which leaks past the deteriorating elastomeric O-ring.

Figure 1:
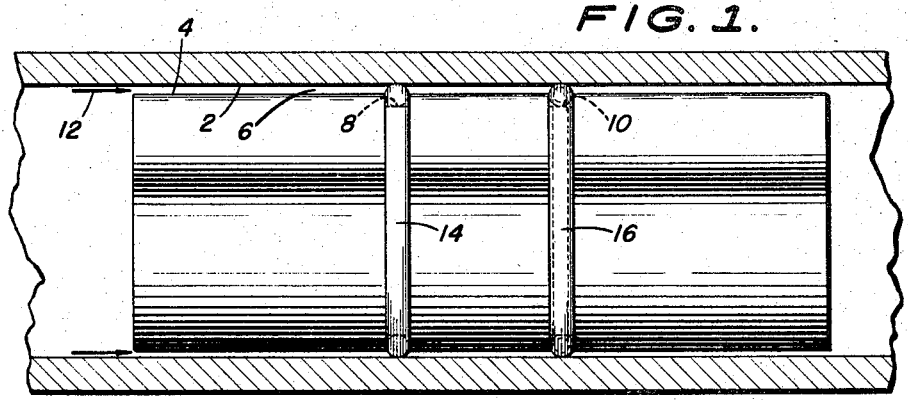
FIG. 1 is an axial section through the outer of two telescoped members, the inner member and the sealing arrangement which constitutes the present invention being shown in elevation.
Figure 2:
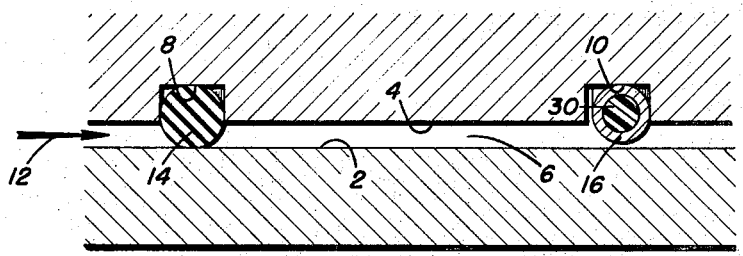
FIG. 2 is an enlarged detail section showing the sealing arrangement of the invention at the initiation of hot fluid flow.
Figure 3:
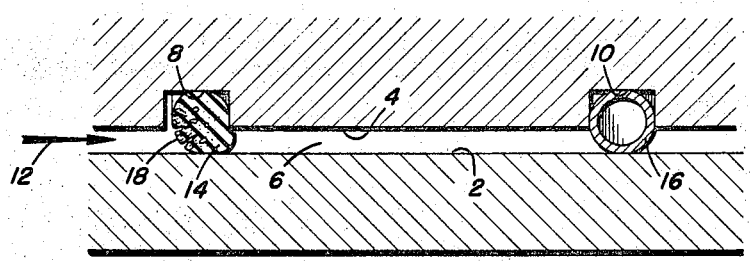
FIG. 3 is a detail section similar to FIG. 2, showing the sealing arrangement of the invention at a time subsequent to the initiation of hot gas flow.

Referring now to FIGS. 1–3, a tubular outer and a tubular inner cylindrical member, indicated at 2 and 4, respectively, are concentrically disposed and define an annular clearance 6 therebetween. The inner member 4 contains a pair of rectangular, spaced, annular grooves 8 and 10 therein, it being understood that alternatively these grooves could be positioned in the member 2. A heated fluid flows into the clearance 6 in the direction indicated by an arrow 12.

Disposed within the groove 8, nearest the incoming flow of fluid, is an elasomeric O-ring 14 of a size to engage both member 2 and the bottom wall of the groove. The O-ring 14 may be constructed from any of a number of compounds, such as silicone rubber, which are capable of withstanding relatively high temperatures. Disposed within the groove 10, which groove is remote from the incoming fluid, is a metallic O-ring 16, which may be hollow or solid in cross section.

The metallic O-ring 16 is of a size to be easily sprung into the groove 10, and hence normally does not extend into engagement with both the bottom wall of the groove 10 and the member 2. It is constructed from a metal having a coefficient of expansion substantially greater than that of either the member 2 or the member 4, and preferably is of a metal that is relatively immune to attack from whatever fluid may be expected to flow into the clearance 6. For many applications stainless steel is a suitable material for the O-ring 16.

Referring to FIGS. 2 and 3 together, the manner in which the invention operates may be understood. In FIG. 1, the elements of the invention are in their initial, relatively cool condition before the flow of a heated liquid is commenced. The metallic O-ring 16 is not in sealing engagement, and only the elastomeric O-ring 14 prevents the fluid entering at 12 from flowing through the clearance 6.

The O-ring seal 14 functions in the usual manner of a fluid responsive elastomeric seal to prevent fluid flow. As the hot fluid, either a gas or a liquid, flows through the member 4, the member becomes heated. The heat is transferred to the O-ring 16 and causes it to expand. Because the ring 16 has a greater coefficient of thermal expansion than either of the two members between which it is disposed, it will expand until it assumes the position shown in FIG. 3, in which it is in tight sealing engagement with both the member 2 and the bottom wall of the groove 10.

The grooves 8 and 10 have been located in the inner member 4 to increase the heat transfer from the member 4 to the metallic O-ring 16. This increase in heat transfer, attained by virtue of the groove placement, is caused by the increased surface area in contact with the metallic O-ring. If the outer member 2 was the higher heat potential, the grooves would be located therein.

The fluid flowing into the passageway may be of such a temperature and so chemically constituted as to erode away the ring 14, as is indicated at 18. However, once the ring 16 has expanded into its sealing position the subsequent destruction of the elastomeric ring 14 is unimportant, as the ring 16 will assume the complete sealing function. Of course, if the joint is to be utilized again the O-ring 14 must be replaced before the next use. In applications such as missile engines this problem does not occur, however, because the engine is normally used but once.

Figure 4:
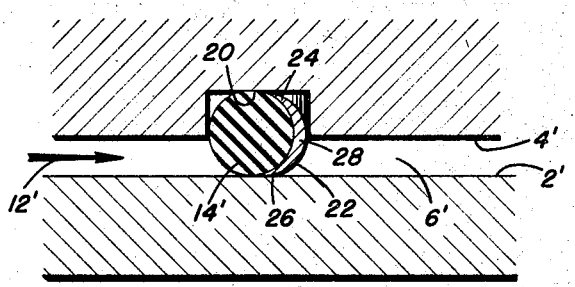
FIG. 4 is an enlarged detail section of a modification of the present invention.

Another embodiment of the invention is illustrated at FIG. 4, in which an outer cylinder member 2' and an inner tubular member 4' are concentrically disposed in spaced relationship to each other. A rectangular annular sealing groove 20 is formed in the member 4' and has disposed therein an elastomeric O-ring 14' and a metallic sealing ring 22. The two sealing rings are so disposed that the elastomeric O-ring 14' faces the incoming fluid flow, which direction is indicated by the arrow 12'.

The metallic sealing ring 22 is substantially semicircular or C-shaped, in cross section, the edges 24 and 26 of the ring 22 being feathered and the midportion 28 being relatively thick for structural stability. The edges 24 and 26 are normally in contact with the member 2' and the bottom wall of the groove 20.

The sealing assembly of FIG. 4 functions in much the same manner as that of FIGS. 1–3, the sealing ring 22 being constructed of a material having a greater coefficient of thermal expansion than either of members 2' or 4'. As the ring 22 is heated by the hot fluid flowing through the tubular member 4', it expands so that the edges 24 and 26 are pressed against the member 2' and the bottom wall of the groove 20 by an increasingly greater force. Further, the C-shape of the ring causes it to respond to fluid pressure, even further increasing its sealing effect.

The hollow, metallic O-ring 16 may, if desired, be filled with an inert gas, or with a solid substance 30 such as Teflon which is initially solid but which sublimes at high temperatures. Such materials within the O-ring further increase the expansion thereof under high temperatures and enhance the sealing properties thereof.

Obviously, many modifications and variations of the present invention are possible in the light of the above teachings. It is therefore to be understood that within the scope of the appended claims the invention may be practiced otherwise than as specifically described.

What is claimed is:

1. In combination with a pair of concentric members having a circumferential clearance therebetween, a two-stage sealing arrangement, comprising a sealing ring in said clearance, said sealing ring having a coefficient of thermal expansion substantially greater than that of either of said members and being heat expandible into sealing engagement with each of said members by heat dissipating from a heated fluid flowing through one of said members and providing a permanent seal against the flow of the heated fluid through said clearance, and an elastomeric sealing ring in said clearance and initially sealing against flow of said heated fluid therethrough until said heat expandible ring sealably engages each of said members.

2. The structure as recited in claim 1, wherein one of said members has a pair of spaced, circumferential grooves therein, said elastomeric ring is disposed in one of said grooves, and wherein said heat expandible ring is disposed in the other of said grooves.

3. The structure as recited in claim 2, wherein said heat expandible ring is hollow and is filled with a solid material which sublimes at elevated temperatures to increase the expansion of said heat expandible ring into sealing engagement with each of said members.

4. The structure as recited in claim 1, wherein one of said concentric members is provided with a circumferential groove therein, said elastomeric ring is disposed in said groove, and wherein said heat expandible ring is disposed in said groove and partially surrounds said elastomeric ring.

References Cited

UNITED STATES PATENTS

| 1,057,112 | 3/1913 | Bavier | 277—58 |
| 1,346,806 | 7/1920 | Bloom | 277—208 |
| 2,737,405 | 3/1956 | Shinn | 277—226 |
| 2,893,795 | 7/1959 | Dooling | 277—207 |

FOREIGN PATENTS

| 12,041 | 1904 | Great Britain. |
| 610,973 | 6/1926 | France. |

LAVERNE D. GEIGER, *Primary Examiner.*

D. MASSENBERG, *Assistant Examiner.*